United States Patent [19]

Honda et al.

[11] Patent Number: 5,538,348
[45] Date of Patent: Jul. 23, 1996

[54] SELF-ALIGNING ROLLER BEARING WITH CAGE

[75] Inventors: Akiyoshi Honda; Kunio Fukuda, both of Kanagawa; Masahide Matsubara, Tokyo; Eiichi Kawamura; Fukuji Kikkawa, both of Kanagawa, all of Japan

[73] Assignee: NSK Ltd., Tokyo, Japan

[21] Appl. No.: 321,524

[22] Filed: Oct. 12, 1994

[30] Foreign Application Priority Data

Oct. 12, 1993 [JP] Japan .................................. 5-253992
May 12, 1994 [JP] Japan .................................. 6-098327
Aug. 26, 1994 [JP] Japan .................................. 6-202264

[51] Int. Cl.⁶ .......................... F16C 33/46; F16C 33/48
[52] U.S. Cl. .................... 384/572; 384/558; 384/575; 384/576; 384/470
[58] Field of Search ............................. 384/558, 568, 384/572, 575, 576, 580, 470

[56] References Cited

U.S. PATENT DOCUMENTS

| | | | |
|---|---|---|---|
| 4,522,516 | 6/1985 | Neese | 384/575 X |
| 4,629,339 | 12/1986 | Moringa | 384/576 |
| 5,051,006 | 9/1991 | Van Voorthuijsen | 384/574 |

FOREIGN PATENT DOCUMENTS

| | | | |
|---|---|---|---|
| 0225975 | 6/1987 | European Pat. Off. | |
| 727785 | 6/1982 | France | 384/572 |
| 19951 | 11/1955 | Germany . | |
| 958442 | 2/1957 | Germany . | |
| 0051083 | 5/1982 | Germany . | |
| 8231304 U | 12/1982 | Germany . | |
| 3139841 | 4/1983 | Germany . | |
| 3327623 | 2/1985 | Germany . | |
| 3537243 | 4/1987 | Germany | 384/572 |
| 4214987 | 11/1992 | Germany . | |
| 9217263 U | 3/1993 | Germany . | |
| 9306319 U | 6/1993 | Germany . | |
| 4240770 | 6/1993 | Germany . | |
| 62-141313 | 6/1987 | Japan . | |
| 2180314 | 7/1990 | Japan . | |
| 24574 | 4/1992 | Japan . | |
| 30556 | 4/1993 | Japan . | |
| 661256 | 11/1951 | United Kingdom . | |
| 2013791 | 8/1979 | United Kingdom . | |

*Primary Examiner*—Thomas R. Hannon
*Attorney, Agent, or Firm*—Sughrue, Mion, Zinn, Macpeak & Seas

[57] ABSTRACT

In a self-aligning roller bearing providing an outer race, an inner race, a plurality of barrel-shaped rollers, and a pair of cages, guide surfaces formed on outward flange portions of the cages for guiding the barrel-shaped rollers are caused to come closer to ends of the barrel-shaped rollers, so that the barrel-shaped rollers can be guided without fail even if an axial load is received. Therefore, the barrel-shaped rollers are prevented from being skewed, from increasing in torque required for rotating the barrel-shaped rollers, and from seizing up the barrel-shaped rollers.

34 Claims, 7 Drawing Sheets

FIG. 13
PRIOR ART

SELF-ALIGNING ROLLER BEARING WITH CAGE

BACKGROUND OF THE INVENTION

A self-aligning roller bearing with a cage according to the present invention is used, e.g., to support a rotating shaft inside a housing while assembled to various types of machinery.

Figure 11:
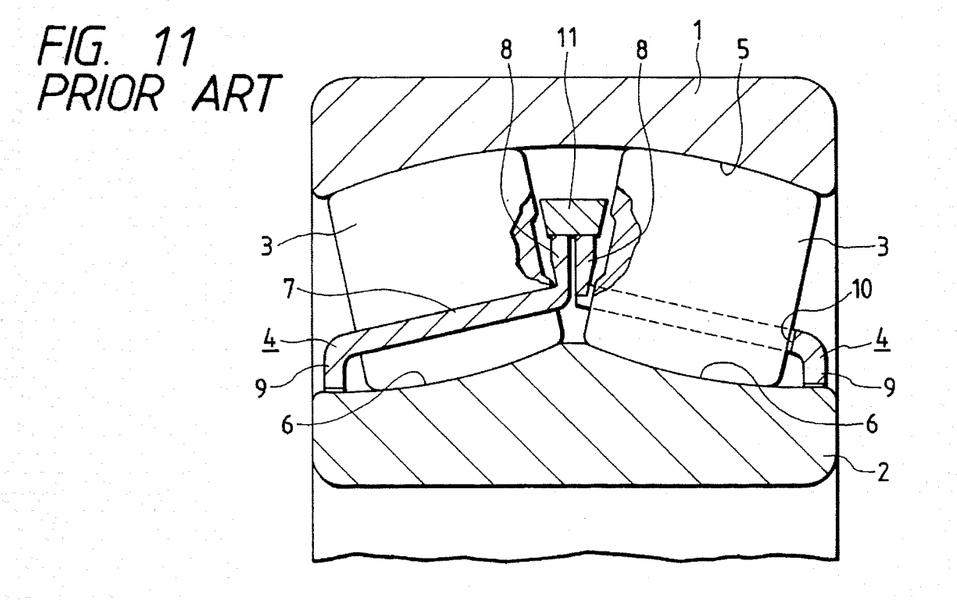
FIG. 11 is a partially sectional view showing a first example of a conventional structure.

For example, to rotatably support a heavy shaft inside a housing, a self-aligning roller bearing such as disclosed in, e.g., Unexamined Japanese Patent Publication No. Hei. 5-157116 has been used conventionally. This self-aligning roller bearing with a cage is, as shown in FIG. 11, formed by arranging a plurality of barrel-shaped rollers 3, 3 so as to be rollable between an outer race 1 and an inner race 2, both races being concentrically assembled. Cages 4, 4 prevent the plurality of barrel-shaped rollers 3, 3 from being separated from each other. The cages 4, 4 are so-called "pressed cages" formed by press-molding a metal plate.

In the inner circumferential surface of the outer race 1 is formed an outer raceway 5 that is a spherically recessed surface having a single center. On both sides in the width direction of the outer circumferential surface of the inner race 2 (in the horizontal direction as viewed in FIG. 11) are formed a pair of inner raceways 6, 6, each of which confronts the outer raceway 5. The plurality of barrel-shaped rollers 3, 3 are so formed that each is symmetrical with respect to the largest diameter portion that is in the middle of the length thereof and are arranged in two rows between the outer raceway 5 and the pair of inner raceways 6, 6 so as to be rollable therebetween.

Figure 12:
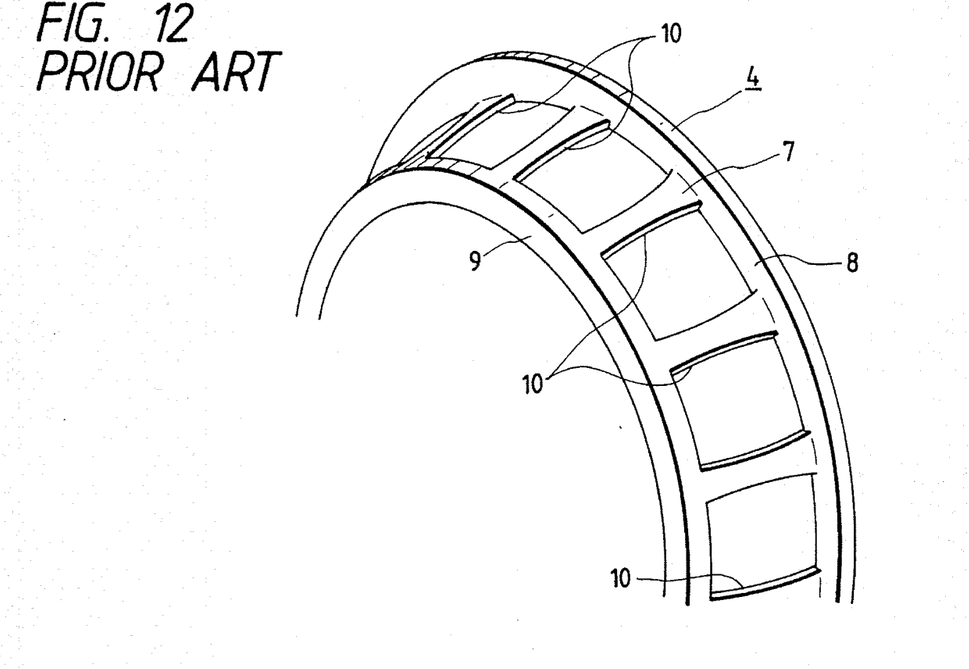
FIG. 12 is a partially perspective view showing a cage assembled in the conventional structure.

As shown in FIGS. 11 and 12, each of the cages 4, 4 has a conically cylindrical main portion 7 and an outward flange portion 8 extending outwardly in the radial direction from the large-diameter side edge portion of the main portion 7, and an inward flange portion 9 extending inwardly in the radial direction from the small-diameter side edge portion thereof. The main portion 7 has a plurality of pockets 10, 10. Each pocket 10 retains a single barrel-shaped roller 3 so as to be rollable therein.

The outer circumferential edges of the outer flange portions 8, 8 of the pair of cages 4, 4 are guided by a guide ring 11 so as to be in slidable contact with the inner circumferential surface of the guide ring 11. This guide ring 11 is disposed so as to be rotatable between the two rows into which the plurality of barrel-shaped rollers 3, 3 are arranged. Further, both side surfaces of the guide ring 11 guide the barrel-shaped rollers 3, 3 by the side surfaces thereof which approach ends of two respective barrel-shaped rollers 3, 3 to prevent the axes of rotation of the barrel-shaped rollers 3, 3 from being skewed from the regular positions.

To support, e.g., a rotating shaft inside a housing with the thus constructed self-aligning roller bearing with the cage, the outer race 1 is firmly fitted into the housing from inside and the inner race 2 is firmly fitted over the rotating shaft from outside. If the inner race 2 is rotated together with the rotating shaft, the plurality of barrel-shaped rollers 3, 3 are rolled to allow the inner race 2 to be rotated. If the axial center of the housing is not aligned with that of the rotating shaft, then it is the inner race 2 that adjusts the alignment within the outer race 1 (the center axis of the inner race 2 is caused to be inclined with respect to that of the outer race 1) to correct such misalignment. In this case, since the outer raceway 5 is formed so as to be a single spherical surface, the rolling of the plurality of barrel-shaped rollers 3, 3 can be effected smoothly even after the misalignment has been rectified.

Figure 13:
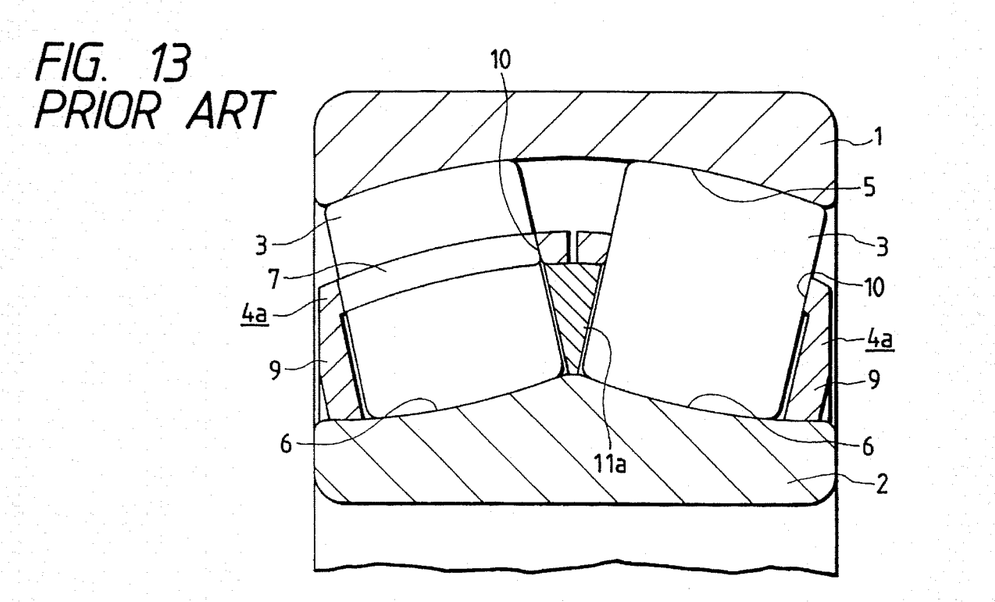
FIG. 13 is a partially sectional view showing a second example of a conventional structure.

As shown in FIG. 13, a self-aligning roller bearing using cages 4a, 4a that do not have the outward flange portions 8, 8 (see FIGS. 11 and 12) and inner circumferential surfaces on ends of these cages 4a, 4a which oppose the outer circumferential edges of a guide ring 11a is also available. Like the above-mentioned structure, this structure shown in FIG. 13 is also designed to guide the barrel-shaped rollers 3, 3 with both side surfaces of the guide ring 11a nearing the ends of the barrel-shaped rollers 3, 3 so that skewing of the barrel-shaped rollers is prevented.

However, in the thus constructed and operating conventional self-aligning roller bearing with the cage, there are the following problems to be overcome.

That is, when a large axial load is applied to the self-aligning roller bearing with the cage, only the rolling surfaces of the barrel-shaped rollers 3 in one row out of the barrel-shaped rollers 3, 3 in two rows are abutted against the outer raceway 5 and the inner raceway 6 to strongly support the load. The pressure at which the rolling surfaces of the barrel-shaped rollers in the other row are abutted against both raceways 5, 6 is reduced almost to zero, so that the barrel-shaped rollers 3 in the other row can move in the axial direction. As a result, each of the guide rings 11, 11a is displaceable toward the barrel-shaped rollers 3 in the other row. When each of the guide rings 11, 11a is displaced, the distance between the ends of the barrel-shaped rollers 3 in the one row and the side surface of each of the guide ring 11, 11a becomes so large that the barrel-shaped rollers 3 in the one row tend to skew.

For example, in the self-aligning roller bearings with the cages as shown in FIGS. 11, 13, when an axial load is applied to the outer race 1 in the left direction or to the inner race 2 in the right direction, the guide rings 11, 11a are displaceable in the left direction in both figures. The barrel-shaped rollers 3 on the right side row are easily skewed while supporting the axial load.

When the barrel-shaped rollers 3 supporting the load have skewed, the frictional force acting between the rolling surfaces of the barrel-shaped rollers 3 and the inner and outer raceways 5, 6 is excessively large, so that there is an increase in the torque for rotating the self-aligning roller bearing with the cage. Besides, if the frictional force is extremely large, the rollers seize up so that the self-aligning roller bearing causes breakdown. On the other hand, the skewing of a barrel-shaped roller 3 that is substantially free from thrust load (the barrel-shaped roller 3 on the left side in both figures) is not objectionable.

Further, as shown in FIG. 13, in the case of guiding the guide ring 11a into the inner race 2, rolling slippage in which the inner circumferential edge of the guide ring 11a slidably contacts the outer circumferential surface of the inner race 2 in the direction of rolling, occurs and such rolling slippage occurs also between the guide ring 11a and the barrel-shaped rollers 3. The frictional heat derived from the rolling slippage increases the temperature within the self-aligning roller bearing, which in turn deteriorates the performance of the self-aligning roller bearing.

SUMMARY OF THE INVENTION

A self-aligning roller bearing with a cage according to the present invention has been made in view of the circumstances in a conventional self-aligning roller bearing. The self-aligning roller bearing includes: an outer race having an outer raceway formed on an inner circumferential surface thereof, the outer raceway having a spherically recessed surface with a single center; an inner race having a pair of inner raceways formed on an outer circumferential surface thereof, the pair of inner raceways confronting the outer raceway; a plurality of barrel-shaped rollers rollingly arranged along two rows between the outer raceway and inner raceways; and a pair of cages for retaining the barrel-shaped rollers so as to be rollable therein, each cage having a conically cylindrical main portion having a plurality of pockets, each cage having an outward flange portion extending outwardly in the radial direction and an inward flange portion extending inwardly in the radial direction, the outward flange portion and the inward flange portion being formed on a large-diameter side edge portion of the main portion and on a small-diameter side edge portion thereof, respectively.

Particularly, in the self-aligning roller bearing with the cage according to the present invention, the outward flange portion includes a portion serving as a guide surface for guiding the barrel-shaped rollers, the portion confronting ends of the barrel-shaped rollers.

As a result of the thus constructed self-aligning roller bearing with the cage according to the present invention, the operation of the bearing in the case of supporting a rotating shaft inside a housing is similar to that of the conventional self-aligning roller bearing with the cage.

Particularly, the self-aligning roller bearing of the present invention is characterized as guiding an end of each barrel-shaped roller with the side surface of the outward flange portion formed on each cage. Therefore, even if an axial load is received, the gap between the end and the surface guiding such end does not change. As a result, even if the barrel-shaped rollers in the one row are displaceable in the axial direction while receiving the axial load, the barrel-shaped roller in the other row remains hard to skew.

Further, no rolling slippage occurs between the barrel-shaped rollers and the cage. As a result, frictional heat produced within the bearing is decreased, compared with the conventional structure in which the rolling slippage occurs between the guide ring and the barrel-shaped rollers, thereby controlling the impairment of performance of the self-aligning roller bearing.

DETAILED DESCRIPTION OF THE PREFERRED EMBODIMENTS

Figure 1:
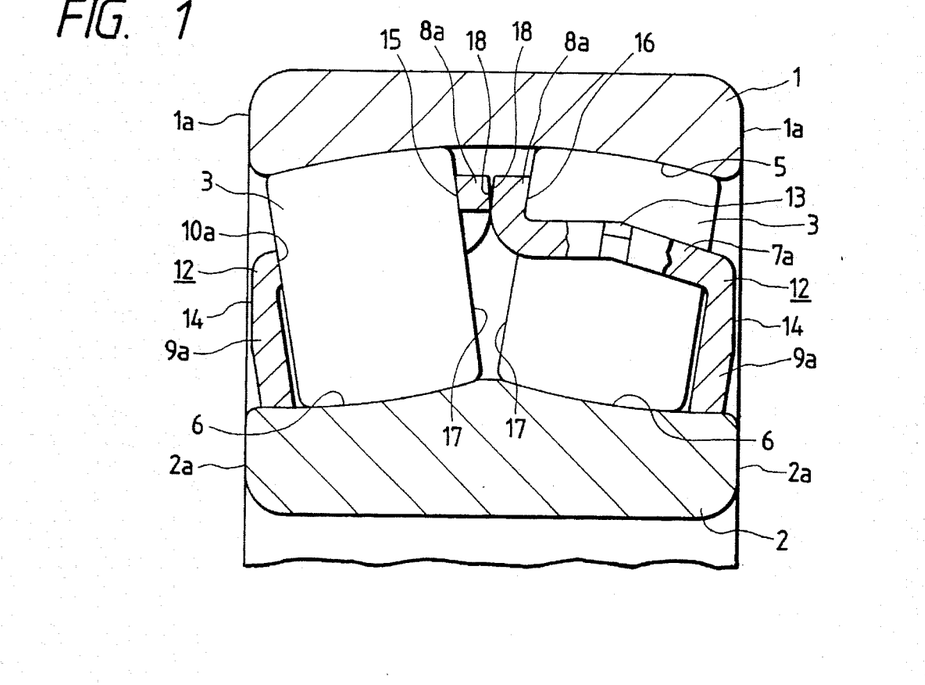
FIG. 1 is a partially sectional view showing a first embodiment of the present invention.
Figure 2:
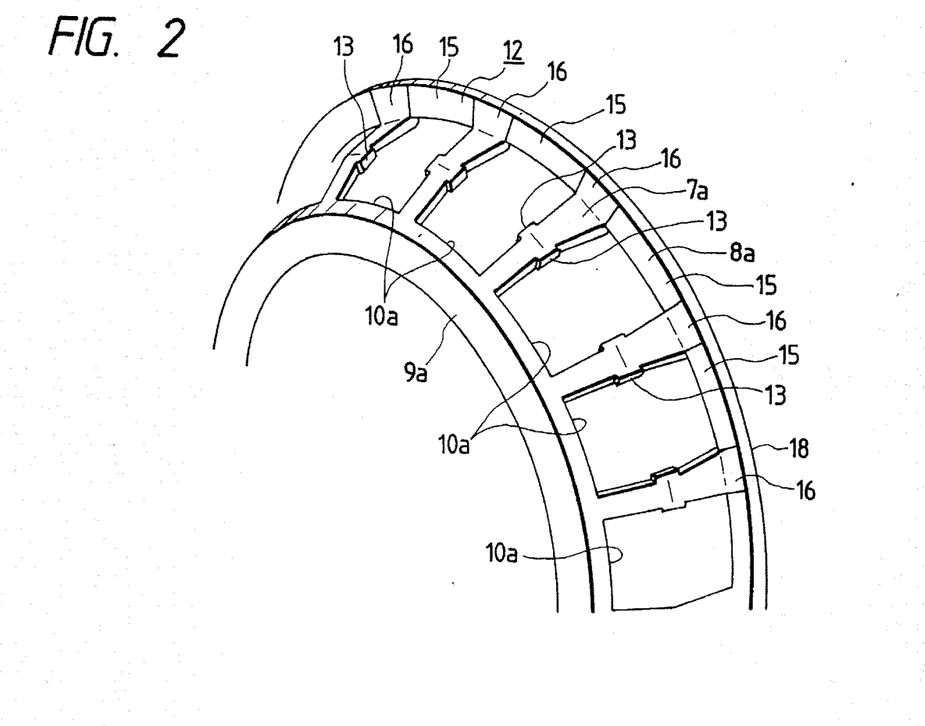
FIG. 2 is a partially perspective view of the first embodiment showing only a cage.
Figure 3:
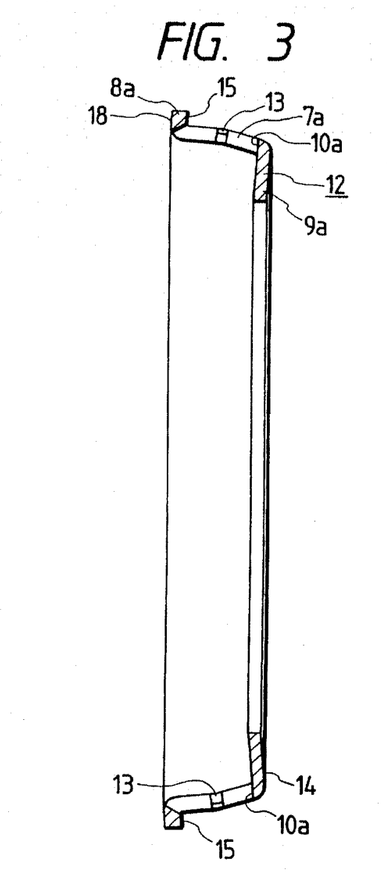
FIG. 3 is a sectional view of FIG. 2.

FIGS. 1 to 3 show a first embodiment of the present invention. The features of the present invention will be described below. Parts and components similar to those of a conventional self-aligning roller bearing with a cage will be denoted by the same reference numerals and overlapping descriptions will be omitted.

A cage 12 assembled to a self-aligning roller bearing with a cage according to the present invention is formed by press-molding a metal plate or by injection-molding a synthetic resin in a manner similar to the cage 4 assembled to the conventional structure (see FIGS. 11 and 12). This cage 12 has a conically cylindrical main portion 7a, an outward flange portion 8a extending outwardly in the radial direction from the large-diameter side edge portion of the main portion 7a, and an inward flange portion 9a extending inwardly in the radial direction from the small-diameter side edge portion. A plurality of pockets 10a, 10a are formed in the main portion 7a. Each pocket 10a retains a single barrel-shaped roller 3 so as to be rollable therein.

The main portion 7a is located outside the pitch circle of the plurality of barrel-shaped rollers 3, 3 in the radial direction so that the barrel-shaped rollers 3, 3 are prevented from pulling out of the main portion 7a in the radial direction through the pockets 10a, 10a. Further, in the case of the embodiment shown in the drawings, projecting pieces 13, 13 are formed in the middle of both side edges in the circumferential edge of each pocket 10a. The front edge of each of these projecting pieces 13, 13 is inclined in such a direction that the dimension of projection from the circumferential edge increases as the edge goes outward in the radial direction. By engaging the projecting pieces 13, 13 with the rolling surfaces of the barrel-shaped rollers 3, 3, the barrel-shaped rollers 3, 3 are prevented from pulling out in the radial direction of the cage 12 (upward as viewed in FIG. 1) from the pockets 10a, 10a without fail.

Further, a flat surface 14 is formed on a half portion close to the outer circumference of the inward flange portion 9a. This flat surface 14 extends in such a direction as to be substantially parallel with an end 1a of the outer race 1 and an end 2a of the inner race 2 with the cage 12 assembled to the self-aligning roller bearing. The flat surface 14 prevents the half portion close to the outer circumference of the inward flange portion 9a from being projected from the ends 1a, 2a.

Flat guide surfaces 15, 15 are formed on portions confronting the pockets 10a, 10a on the outer side surface of the outward flange portion 8a. The guide surfaces 15, 15 adjacent to each other in the circumferential direction are continued through connecting surfaces 16, 16. Such guide surfaces 15, 15 are parallel with ends 17, 17 of the barrel-shaped rollers 3, 3 retained within the pockets 10a, 10a and come close to these ends 17, 17. It is under this condition that the guide surfaces 15, 15 guide the barrel-shaped rollers 3, 3 to prevent the central axis of rotation of the rollers 3, 3 from being skewed from the regular condition.

Still further, to retain the barrel-shaped rollers 3, 3 arranged in two rows, the outward flange portions 8a, 8a of the pair of cages 12, 12 assembled to the self-aligning roller bearing have inner ends 18, 18 thereof abutted against each other all along the circumference. Therefore, the pair of cages 12, 12 rotate in the same direction with the one cage guiding the other.

The operation of the thus constructed self-aligning roller bearing with the cage to support a rotating shaft inside a housing according to the present invention is similar to that of the conventional self-aligning roller bearing with the cage.

Particularly, the self-aligning roller bearing with the cage according to the present invention guides the ends 17, 17 of the barrel-shaped rollers 3, 3 by the guide surfaces 15, 15 arranged on the outer side surfaces of the outward flange portions 8a, 8a formed on the cages 12, 12. Therefore, the relationship between the ends 17, 17 and the guide surfaces 15, 15 does not change irrespective of the operating conditions of the self-aligning roller bearing with the cage. That is, even if the outer race 1 or the inner race 2 receives an axial load and the positional relationship between the outer raceway 5 and the inner raceway 6 in the axial direction is thereby displaced, the gaps between the ends 17, 17 and the guide surfaces 15, 15 do not change. As a result, even if the barrel-shaped rollers 3 in the one row are displaceable in the axial direction with an axial load received, the barrel-shaped rollers in the other row (as well as in the one row) are hard to skew.

In the case of the embodiment shown in the drawings, the guide surfaces 15, 15 are flat and extend in parallel with the ends 17, 17 of the barrel-shaped rollers 3, 3. Therefore, the guide surfaces 15, 15 are abutted against the ends 17, 17 of the barrel-shaped rollers 3, 3 substantially uniformly over the entire surfaces at which the guide surfaces confront the ends. As a result, the barrel-shaped rollers 3, 3 can be guided by the guide surfaces 15, 15 satisfactorily, which in turn prevents the barrel-shaped rollers 3, 3 from being skewed with more certainty.

On the other hand, in the case of the conventional structure shown in FIGS. 11, 13, both side surfaces of the guide rings 11, 11a are either conically or spherically recessed, though slightly. Therefore, unless the ends 17, 17 of the barrel-shaped rollers 3, 3 are machined to be conically projected or spherically projected, there is no likelihood that both side surfaces of these guide rings 11, 11a will be abutted against the ends 17, 17 over the entire surfaces at which the guide rings confront the ends. As a result, the prevention of the barrel-shaped rollers 3, 3 from being skewed is not always ensured even in the case where the self-aligning roller bearing with the cage does not receive an axial load. Machining of the ends 17, 17 of the barrel-shaped rollers 3, 3 into conically projected surfaces or spherically projected surfaces is cumbersome and disadvantageous in terms of the cost of manufacture.

Further, in the case of the embodiment shown in the drawings, the guide rings 11, 11a such as those of the conventional structure are omitted and, instead, the outward flange portions 8a, 8a of the pair of cages 12, 12 are set end-to-end. As a result, not only the frictional heat produced within the bearing can be reduced by reducing rolling slippage, but also the self-aligning roller bearing can be lubricated efficiently. That is, in the case where the self-aligning roller bearing used with the inner race 2 rotated is to be lubricated, lubricating oil is generally sent to portions at which the barrel-shaped rollers 3, 3 are arranged through an oil supply port 23 (see FIG. 8, which will be described later) formed in the middle of the width (in the horizontal direction of FIG. 1) of the outer race 1. While the guide rings 11, 11a resist the flow of such lubricating oil in the above-mentioned conventional structures, the absence of the guide rings 11, 11a contributes to smooth flow of the lubricating oil in the self-aligning roller bearing with the cage according to the present invention. The absence of the guide rings 11, 11a further contributes to a cost reduction derived from a reduction in the number of parts.

The technique that large stress concentration at the corners of the bent portions and pockets 10a, 10a is prevented by contriving the positions at which to bend the outward flange portions 8a, 8a is similar to that used in the conventional self-aligning roller bearing with the cage. Therefore, the description of such structure is omitted; the structure is only shown in the drawing.

Figure 4:
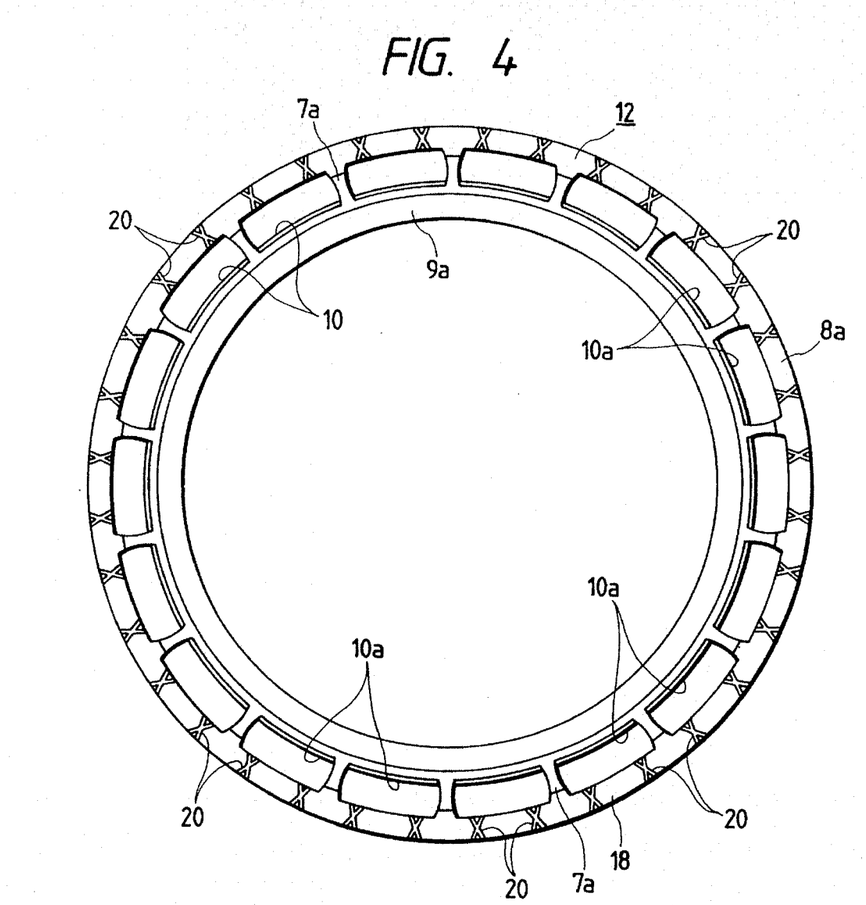
FIG. 4 is a view of a first exemplary shape of oil grooves formed on an outward flange portion of the cage, as viewed from the left side of FIG. 3.
Figure 5:
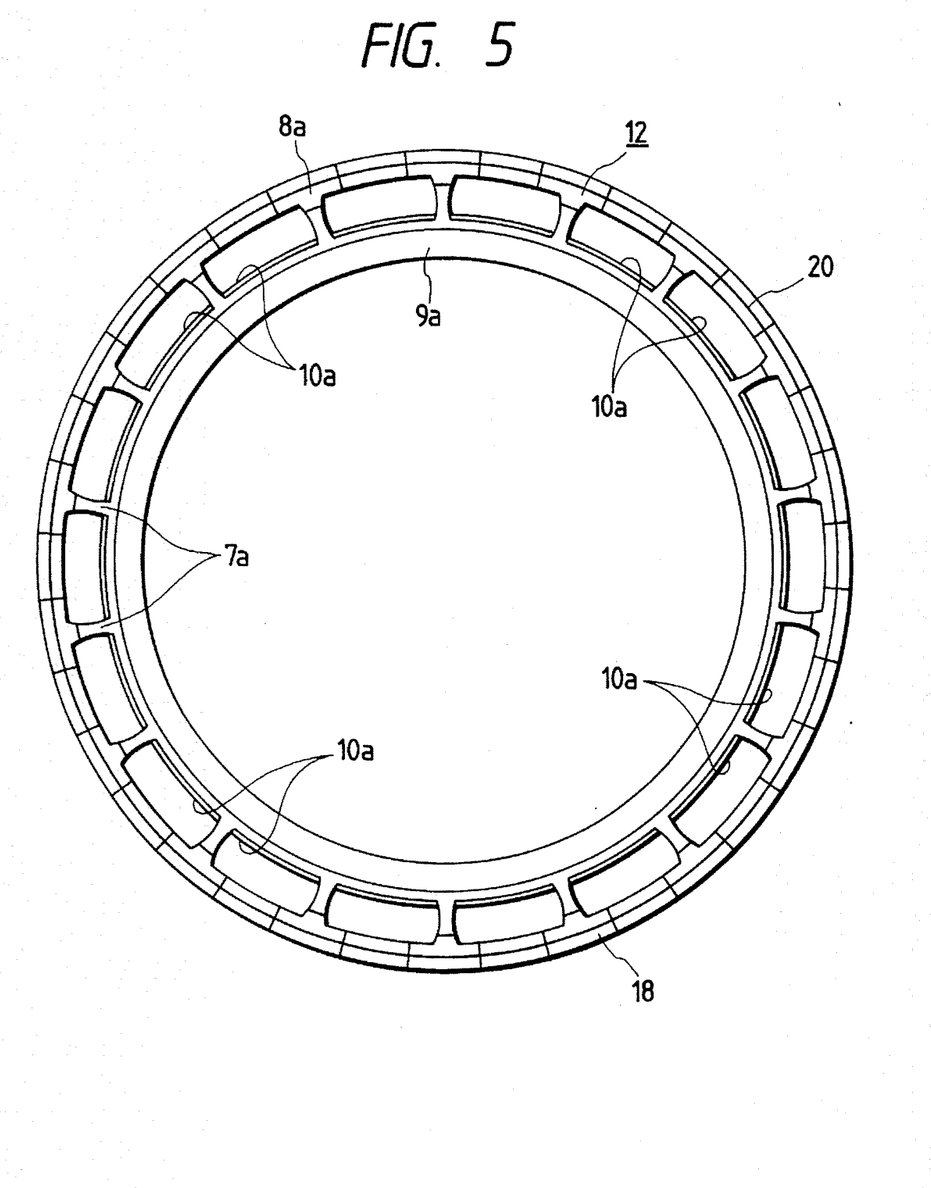
FIG. 5 is a view of a second exemplary shape of an oil groove similar to FIG. 4.

Oil grooves 20, 20 such as shown in FIG. 4 or 5 may be formed on the inner ends 18, 18 of the outward flange portions 8a, 8a disposed on the outer circumference of the inner ends of the pair of cages 12, 12 as necessary. The oil grooves 20, 20 are designed to reduce friction by improving lubrication between the outward flange portions 8a, 8a. That is, the inner ends 18, 18 of the outward flange portions 8a, 8a are set end-to-end when assembled to the self-aligning roller bearing. The speeds of rotation of the pair of cages 12, 12 are different from each other depending on the conditions of loads applied to the self-aligning roller bearing, which in turn causes the inner ends 18, 18 of the outward flanges 8a, 8a to rub each other. For example, when the self-aligning roller bearing receives a large axial load, a barrel-shaped roller 3 on the load side and the cage 12 retaining such barrel-shaped roller 3 rotate in association with the rotation of the outer race 1 relative to the inner race 2, whereas a barrel-shaped roller 3 on the side opposite to the load side and the cage 12 retaining such barrel-shaped roller 3 hardly rotate. As a result, the inner ends 18, 18 of the outward flange portions 8a, 8a rub each other.

As the friction between the outward flanges 8a, 8a increases, the torque required for rotating the self-aligning roller bearing increases, which in turn impairs the performance of the machinery to which the self-aligning roller bearing is assembled. Further, since the frictional heat increases the temperature within the bearing, the performance of the self-aligning roller bearing is deteriorated. On the other hand, if the oil grooves 20, 20 such as shown in FIGS. 4 and 5 are formed on the confronting inner ends 18, 18 of the outward flanges 8a, 8a, friction between the inner ends 18, 18 can be reduced to thereby control the increase in the torque of and temperature within the bearing. FIG. 4 shows an example in which a plurality of X-shaped oil grooves 20, 20 are formed in the circumferential direction; and FIG. 5 shows an example in which the main portion of the oil groove 20 extends in the circumferential direction with sub portions intersecting the main portion at a plurality of positions along the main portion. Either oil groove 20 has such a conventionally known sectional shape as V, U, C, and the like. These oil grooves 20 are not always essential for the self-aligning roller bearing with the cage according to the present invention. If arranged, the oil grooves may be disposed only on the outward flange 8a of one cage 12. If disposed, however, on both outward flanges 8a, 8a, a sufficient amount of lubricant can be loaded between the surfaces of abutment, so that a significant reduction in friction can be achieved.

Figure 6:
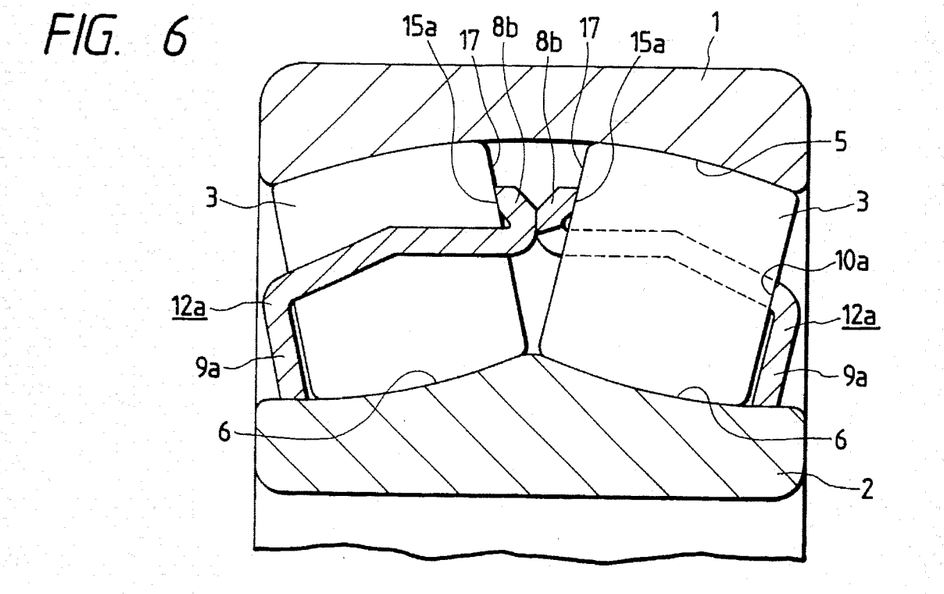
FIG. 6 is a partially sectional view showing a second embodiment of the present invention.
Figure 7:
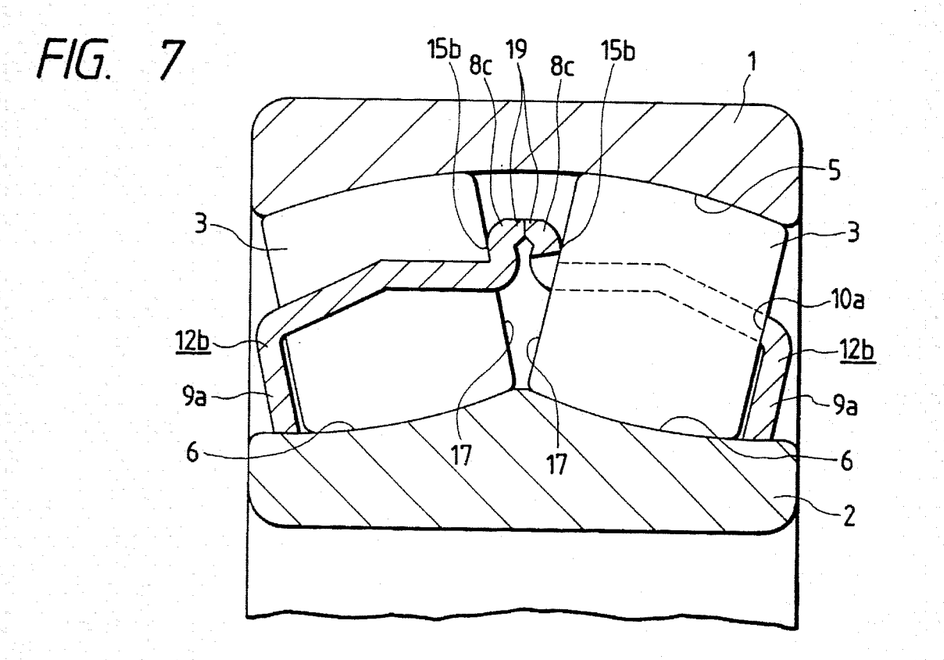
FIG. 7 is a partially sectional view showing a third embodiment of the present invention.

FIGS. 6 and 7 show second and third embodiments. First, in the case of the second embodiment shown in FIG. 6, outward flange portions 8b, 8b are formed on inner ends of cages 12a, 12a, each outward flange portion being formed by folding back a metal plate. By machining the front edges of these outward flange portions 8b, 8b in flat shapes, guide surfaces 15a, 15a that guide the ends 17, 17 of the barrel-shaped rollers 3, 3 are formed.

Then, in the case of the third embodiment shown in FIG. 7, bent edges 19, 19 are formed by bending inwardly the outer circumferential edges of outward flange portions 8c, 8c formed on the inner edges of cages 12b, 12b. The inner edges of the bent edges 19, 19 formed on the pair of cages 12b, 12b are set end-to-end. Guide surfaces 15b, 15b that guide the ends 17, 17 of the barrel-shaped rollers 3, 3 are formed on the inner circumferential edges of the outward flange portions 8c, 8c.

Like the first embodiment, the second and third embodiments are designed to prevent the barrel-shaped rollers 3, 3 in one row from being skewed effectively by preventing change in the gaps between the ends 17, 17 of the barrel-shaped rollers 3, 3 and the guide surfaces 15a, 15b even when an axial load is received. In addition, in the second and third embodiments the oil grooves 20 shown in FIGS. 4 and 5 may also be formed on the inner ends of the outward flanges 8b, 8c as necessary.

Figure 8:
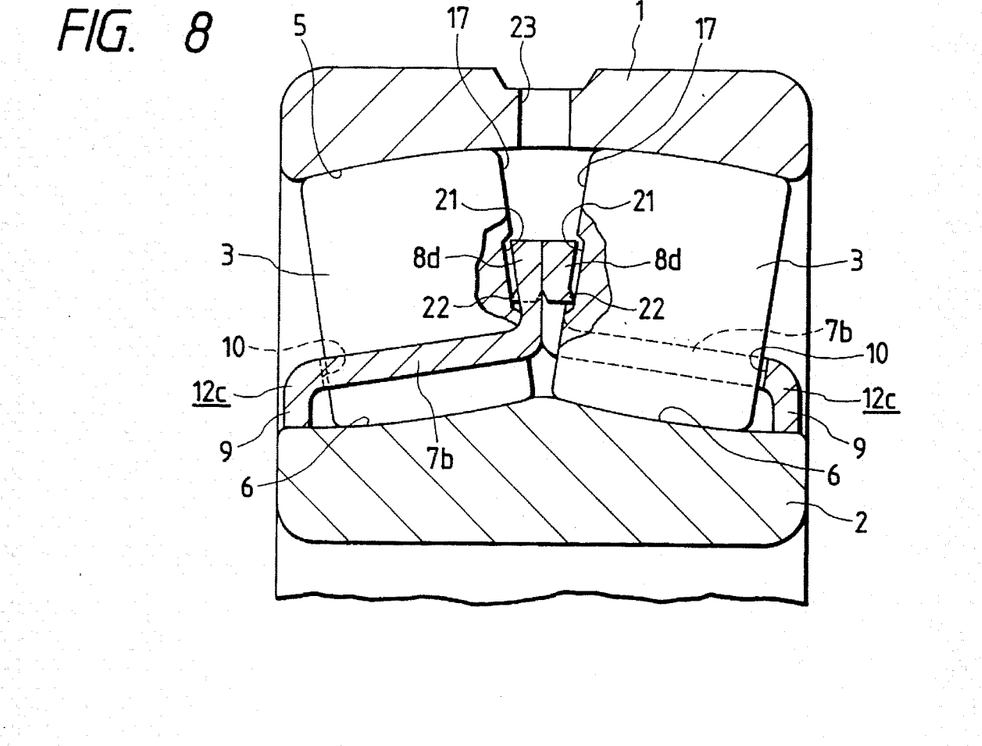
FIG. 8 is a partially sectional view showing a fourth embodiment of the present invention.
Figure 9:
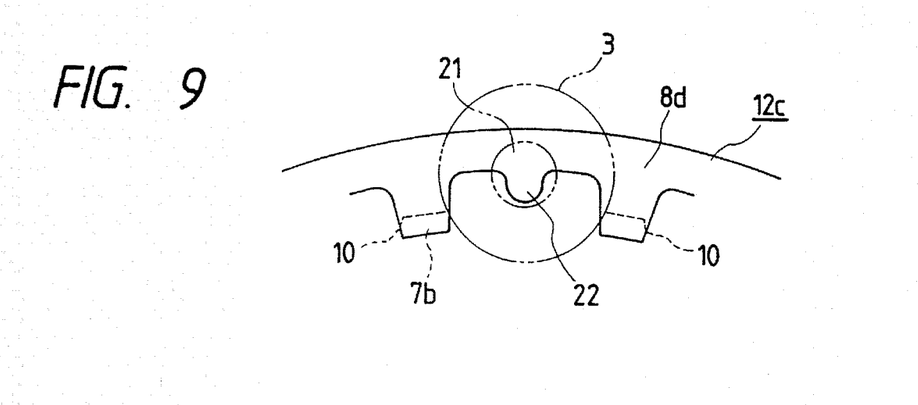
FIG. 9 is a partially side view of the cage on the right side of FIG. 8 as viewed from the left side of FIG. 8.
Figure 10:
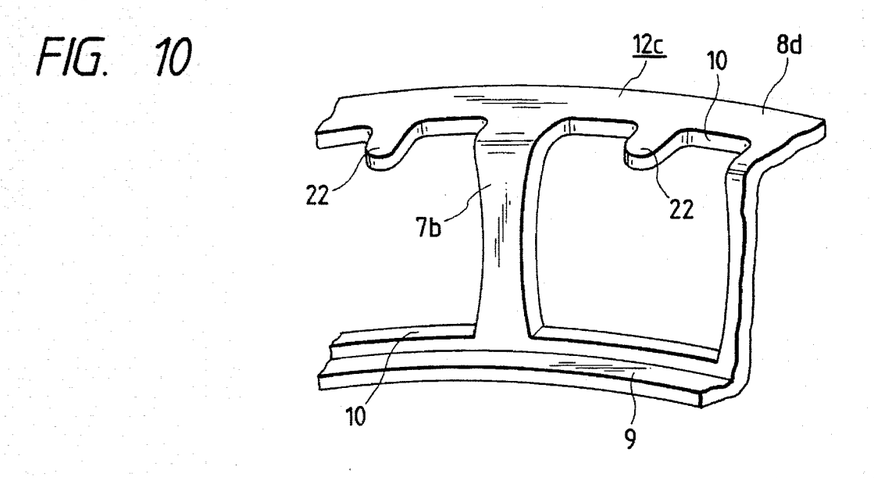
FIG. 10 is a partially perspective view of a cage used in the fourth embodiment of the present invention.

FIGS. 8 to 10 show a fourth embodiment of the present invention. This embodiment is characterized as preventing the barrel-shaped rollers 3, 3 from pulling out of the pockets 10, 10 in the radial direction through the engagement of recessed portions 21, 21 formed on the ends 17, 17 of the barrel-shaped rollers 3, 3 with tongues 22, 22 formed on the inner circumferential edges of the pockets 10, 10 of cages 12c, 12c. As a result of this design, main portions 7b, 7b of the respective cages 12c, 12c are located inward in the radial direction (downward as viewed in FIGS. 8 and 9) from the pitch circle of the barrel-shaped rollers 3, 3. The respective tongues 22, 22 are engaged with the recessed portions 21, 21 by causing the front ends thereof to enter into the recessed portions 21, 21.

The recessed portions 21, 21 in the above embodiment are circular in shape and located at the center of ends of the barrel-shaped rollers 3, 3. However, the recesses formed on the ends of the barrel-shaped rollers 3, 3 may also have an annular shape that is concentric with the barrel-shaped rollers 3, 3. The oil grooves 20 such as shown in FIGS. 4 and 5 may be formed in the inner side surfaces of outward flanges 8d, 8d also in the fourth embodiment of the present invention.

The present invention is constructed and operated as described above. Since the present invention can prevent the barrel-shaped rollers from being skewed without fail irrespective of the conditions of use, the increase in the torque required for rotating the self-aligning roller bearing with the cage or the seizing up of the rollers thereof can be prevented effectively.

What is claimed is:

1. A self-aligning roller bearing with a cage comprising:

an outer race including an outer raceway formed on an inner circumferential surface thereof, the outer raceway having a spherically recessed surface with a single center;

an inner race including a pair of inner raceways formed on an outer circumferential surface thereof, the inner raceways confronting the outer raceway;

a plurality of barrel-shaped rollers rollingly arranged in two rows between the outer raceway and the inner raceways; and first and second cages for retaining the barrel-shaped rollers so as to be rollable therein, each of the first and second cages including a conically cylindrical main portion having a plurality of pockets, an outward flange portion extending outwardly in a radial direction and an inward flange portion extending inwardly in the radial direction, the outward flange portion and the inward flange portion being formed on a large-diameter side edge portion of the main portion and on a small-diameter side edge portion thereof, respectively, wherein the outward flange portion includes a portion serving as a guide surface for guiding the barrel-shaped rollers, the portion confronting an end of the respective barrel-shaped rollers, wherein the outward flange portion of the first cage has an inner end which is abutted against the outward flange portion of the second cage along the entire circumferences of the first and second cages.

2. The self-aligning roller bearing of claim 1, wherein the main portion is located outside a pitch circle of the barrel-shaped rollers in the radial direction.

3. The self-aligning roller bearing of claim 1, wherein each of the pockets includes a pair of projecting pieces formed in the middle of both side edges of the respective pockets in a circumferential direction, a front edge of each of the projecting pieces being inclined so that a projecting dimension from the side edges increases in the outward radial direction.

4. The self-aligning roller bearing of claim 1, wherein the inward flange portion includes a flat surface formed on a half portion close to an outer circumference of the inward flange portion so that the flat surface is substantially parallel with an end of the outer race and an end of the inner race.

5. A self-aligning roller bearing with a cage, comprising:

an outer race including an outer raceway formed on an inner circumferential surface thereof, the outer raceway having a spherically recessed surface with a single center;

an inner race including a pair of inner raceways formed on an outer circumferential surface thereof, the inner raceways confronting the outer raceway;

a plurality of barrel-shaped rollers rollingly arranged in two rows between the outer raceway and the inner raceways; and first and second cages for retaining the barrel-shaped rollers so as to be rollable therein, each of the first and second cages including a conically cylindrical main portion having a plurality of pockets, an outward flange portion extending outwardly in a radial direction and an inward flange portion extending inwardly in the radial direction, the outward flange portion and the inward flange portion being formed on a large-diameter side edge portion of the main portion and on a small-diameter side edge portion thereof, respectively wherein the outward flange portion includes a portion serving as a guide surface for guiding the barrel-shaped rollers, the portion confronting an end of the respective barrel-shaped rollers, and wherein the outward flange portion has an oil groove formed on an inner end thereof.

6. The self-aligning roller bearing of claim 5, wherein the oil groove comprises a X-shaped oil groove formed in a circumferential direction of the cages.

7. The self-aligning roller bearing of claim 5, wherein the oil groove comprises a first portion extending in a circumferential direction of the cages and a second portion intersecting the first portion.

8. The self-aligning roller bearing of claim 5, wherein the main portion is located outside a pitch circle of the barrel-shaped rollers in the radial direction.

9. The self-aligning roller bearing of claim 5, wherein each of the pockets includes a pair of projecting pieces formed in the middle of both side edges of the respective pockets in a circumferential direction, each of the projecting pieces having a front edge which is inclined so that a dimension thereof projecting from the side edges increases in the outward radial direction.

10. The self-aligning roller bearing of claim 5, wherein the inward flange portion includes a flat surface formed on a half portion close to an outer circumference of the inward flange portion so that the flat surface is substantially parallel with an end of the outer race and an end of the inner race.

11. The self-aligning roller bearing of claim 5, wherein the outward flange portion of the first cage has an inner end which is abutted against the outward flange portion of the second cage along the entire circumferences of the first and second cages.

12. The self-aligning roller bearing of claim 5, wherein each of the barrel-shaped rollers includes a recessed portion formed on the end thereof, and the main portion is located inward in the radial direction from a pitch circle of the barrel-shaped rollers so that the recessed portion engages a tongue formed on an inner circumferential edge of the respective pockets.

13. The self-aligning roller bearing of claim 12, wherein the recessed portion is circular in shape and is located at a center of the end of the respective barrel-shaped rollers.

14. The self-aligning roller bearing of claim 12, wherein the recessed portion has an annular shape that is concentric with the barrel-shaped rollers.

15. A self-aligning roller bearing with a cage, comprising:
an outer race including an outer raceway formed on an inner circumferential surface thereof, the outer raceway having a spherically recessed surface with a single center;
an inner race including a pair of inner raceways formed on an outer circumferential surface thereof, the inner raceways confronting the outer raceway;
a plurality of barrel-shaped rollers rollingly arranged in two rows between the outer raceway and the inner raceways; and
first and second cages for retaining the barrel-shaped rollers so as to be rollable therein, each of the first and second cages including a conically cylindrical main portion having a plurality of pockets, an outward flange portion extending outwardly in a radial direction and an inward flange portion extending inwardly in the radial direction, the outward flange portion and the inward flange portion being formed on a large-diameter side edge portion of the main portion and on a small-diameter side edge portion thereof, respectively,
wherein the outward flange portion includes a portion serving as a guide surface for guiding the barrel-shaped rollers, the portion confronting an end of the respective barrel-shaped rollers, and wherein the guide surface is formed by machining a front edge of the outward flange portion to have a flat shape, the front edge being folded back.

16. The self-aligning roller bearing of claim 15, wherein the main portion is located outside a pitch circle of the barrel-shaped rollers in the radial direction.

17. The self-aligning roller bearing of claim 15, wherein each of the pockets includes a pair of projecting pieces formed in the middle of both side edges of the respective pockets in a circumferential direction, each of the projecting pieces having a front edge which is inclined so that a dimension projecting from the side edges increases in the outward radial direction.

18. The self-aligning roller bearing of claim 15, wherein the inward flange portion includes a flat surface formed on a half portion close to an outer circumference of the inward flange portion so that the flat surface is substantially parallel with an end of the outer race and an end of the inner race.

19. The self-aligning roller bearing of claim 15, wherein the outward flange portion of the first cage has an inner end which is abutted against the outward flange portion of the second cage along the entire circumferences of the first and second cages.

20. The self-aligning roller bearing of claim 15, wherein each of the barrel-shaped rollers includes a recessed portion formed on the end thereof, and the main portion is located inward in the radial direction from a pitch circle of the barrel-shaped rollers so that the recessed portion engages a tongue formed on an inner circumferential edge of the respective pockets.

21. The self-aligning roller bearing of claim 20, wherein the recessed portions are circular in shape and located at a center of the end of the respective barrel-shaped rollers.

22. The self-aligning roller bearing of claim 20, wherein the recessed portions have an annular shape that is concentric with the barrel-shaped rollers.

23. A self-aligning roller bearing with a cage, comprising:
an outer race including an outer raceway formed on an inner circumferential surface thereof, the outer raceway having a spherically recessed surface with a single center;
an inner race including a pair of inner raceways formed on an outer circumferential surface thereof, the inner raceways confronting the outer raceway;
a plurality of barrel-shaped rollers rollingly arranged in two rows between the outer raceway and the inner raceways; and
first and second cages for retaining the barrel-shaped rollers so as to be rollable therein, each of the first and second cages including a conically cylindrical main portion having a plurality of pockets, an outward flange portion extending outwardly in a radial direction and an inward flange portion extending inwardly in the radial direction, the outward flange portion and the inward flange portion being formed on a large-diameter side edge portion of the main portion and on a small-diameter side edge portion thereof, respectively
wherein the outward flange portion includes a portion serving as a guide surface for guiding the barrel-shaped rollers, the portion confronting an end of the respective barrel-shaped rollers, and wherein the guide surface is formed on an inner circumferential edge of the outward flange portion, an outer circumferential edge of the outward flange portion being bent inwardly.

24. The self-aligning roller bearing of claim 23, wherein the main portion is located outside a pitch circle of the barrel-shaped rollers in the radial direction.

25. The self-aligning roller bearing of claim 23, wherein each of the pockets includes a pair of projecting pieces formed in the middle of both side edges of the respective pockets in a circumferential direction, each of the projecting pieces having a front edge which is so inclined that a dimension projecting from the side edges increases in the outward radial direction.

26. The self-aligning roller bearing of claim 23, wherein the inward flange portion includes a flat surface formed on a half portion close to an outer circumference of the inward flange portion so that the flat surface is substantially parallel with an end of the outer race and an end of the inner race.

27. The self-aligning roller bearing of claim 23, wherein the outward flange portion of the first cage has an inner end which is abutted against the outward flange portion of the second cage along the entire circumferences of the first and second cages.

28. The self-aligning roller bearing of claim 23, wherein each of the barrel-shaped rollers includes a recessed portion formed on the end thereof, and the main portion is located inward in the radial direction from a pitch circle of the barrel-shaped rollers so that the recessed portions engage a tongue formed on an inner circumferential edge of the respective pockets.

29. The self-aligning roller bearing of claim 28, wherein the recessed portions are circular in shape and located at a center of the end of the respective barrel-shaped rollers.

30. The self-aligning roller bearing of claim 28, wherein the recessed portions have an annular shape that is concentric with the barrel-shaped rollers.

31. A self-aligning roller bearing with a cage, comprising:

an outer race including an outer raceway formed on an inner circumferential surface thereof, the outer raceway having a spherically recessed surface with a single center;

an inner race including a pair of inner raceways formed on an outer circumferential surface thereof, the inner raceways confronting the outer raceway;

a plurality of barrel-shaped rollers rollingly arranged in two rows between the outer raceway and the inner raceways; and first and second cages for retaining the barrel-shaped rollers so as to be rollable therein, each of the first and second cages including a conically cylindrical main portion having a plurality of pockets, an outward flange portion extending outwardly in a radial direction and an inward flange portion extending inwardly in the radial direction, the outward flange portion and the inward flange portion being formed on a large-diameter side edge portion of the main portion and on a small-diameter side edge portion thereof, respectively, wherein the outward flange portion includes a portion serving as a guide surface for guiding the barrel-shaped rollers, the portion confronting an end of the respective barrel-shaped rollers, and wherein each of the barrel-shaped rollers includes a recessed portion formed on the end thereof, and the main portion is located inward in the radial direction from a pitch circle of the barrel-shaped rollers so that the recessed portion engages a tongue formed on an inner circumferential edge of the respective pockets.

32. The self-aligning roller bearing of claim 31, wherein the recessed portion is circular in shape and located at a center of the end of the respective barrel-shaped rollers.

33. The self-aligning roller bearing of claim 31, wherein the recessed portion have an annular shape that is concentric with the barrel-shaped rollers.

34. The self-aligning roller bearing of claim 31, wherein the outward flange portion of the first cage has an inner end which is abutted against the outward flange portion of the second cage along the entire circumferences of the first and second cages.

* * * * *